United States Patent
Wang et al.

(10) Patent No.: US 6,775,341 B2
(45) Date of Patent: Aug. 10, 2004

(54) TIME RECOVERY CIRCUIT AND METHOD FOR SYNCHRONIZING TIMING OF A SIGNAL IN A RECEIVER TO TIMING OF THE SIGNAL IN A TRANSMITTER

(75) Inventors: Fan Wang, Vernon Hills, IL (US); Jiangnan Jason Chen, Hawthorne Woods, IL (US); Philip Yuanping Zhou, Guangzhou (CN)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/300,987

(22) Filed: Nov. 21, 2002

(65) Prior Publication Data

US 2003/0108136 A1 Jun. 12, 2003

Related U.S. Application Data

(60) Provisional application No. 60/334,429, filed on Nov. 30, 2001.

(51) Int. Cl.$^7$ ................................................. H04L 7/00
(52) U.S. Cl. ........................................ 375/354; 375/147
(58) Field of Search ................................. 375/130, 142, 375/148, 345; 370/209

(56) References Cited

U.S. PATENT DOCUMENTS

| | | | | |
|---|---|---|---|---|
| 5,619,524 A | * | 4/1997 | Ling et al. | 375/130 |
| 5,659,573 A | * | 8/1997 | Bruckert et al. | 375/142 |
| 5,781,152 A | | 7/1998 | Renard et al. | |
| 5,818,887 A | | 10/1998 | Sexton et al. | |
| 6,055,284 A | | 4/2000 | Kweon | |
| 6,137,773 A | * | 10/2000 | Stilwell et al. | 370/209 |
| 6,154,487 A | | 11/2000 | Murai et al. | |
| 6,456,648 B1 | * | 9/2002 | Bultan et al. | 375/148 |
| 6,633,603 B2 | * | 10/2003 | Bultan et al. | 375/148 |

FOREIGN PATENT DOCUMENTS

| | | |
|---|---|---|
| DE | 03743731 A1 | 7/1989 |
| EP | 0 793 363 A2 | 9/1997 |
| WO | WO 97/06446 A2 | 2/1997 |
| WO | WO 00/21209 A1 | 4/2000 |

OTHER PUBLICATIONS

Sheen, W. et al. "Effects of Multipath Fading on Delay–Locked Loop for Spread Spectrum Systems." *IEEE Transactions on Communications*; vol. 42, No. 2/3/4, Feb./Mar./Apr. 1994, pp. 1947–1956.

Gianneti F. et al. "Design of an all–digital receiver for narrowband continuous–phase asynchronous cdma systems." *Proccedings of the International Conference on Communications (ICC) IEEE*, vol. 3, May 1993. pp. 468–472.

* cited by examiner

*Primary Examiner*—Stephen Chin
*Assistant Examiner*—Lawrence Williams
(74) *Attorney, Agent, or Firm*—Lalita W. Pace

(57) ABSTRACT

The present invention is a time recovery circuit and method for synchronizing timing of a signal in a receiver to timing of the signal in a transmitter. A plurality of samples of the early-late correlation difference are taken around the equilibrium point on the S-curve where the time error is zero. A recursive algorithm is used to compute the time adjustment necessary to time align the transmitter and the receiver by minimizing the squared estimation error.

18 Claims, 6 Drawing Sheets

TIME RECOVERY CIRCUIT AND METHOD FOR SYNCHRONIZING TIMING OF A SIGNAL IN A RECEIVER TO TIMING OF THE SIGNAL IN A TRANSMITTER

REFERENCE(S) TO RELATED APPLICATION(S)

The present application claims priority from provisional application, Serial No. 60/334,429, entitled "TIME RECOVERY CIRCUIT AND METHOD FOR SYNCHRONIZING TIMING OF A SIGNAL IN A RECEIVER TO TIMING OF THE SIGNAL IN A TRANSMITTER," filed Nov. 30, 2001, which is commonly owned and incorporated herein by reference in its entirety.

FIELD OF THE INVENTION

The present invention relates generally to the field of communication systems, and more particularly, to a time recovery circuit and method for synchronizing timing of a signal in a receiver to timing of the signal in a transmitter in a spread spectrum communication system.

BACKGROUND OF THE INVENTION

In a spread spectrum communication system, downlink transmissions from a base transceiver station (BTS) to a wireless communication device, such as a mobile station (MS), include a pilot channel and a plurality of traffic channels. The pilot channel is shared by all users. Each traffic channel is intended for a single user. Therefore, each traffic signal is spread using a code known by both the base station and mobile station. The pilot signal is spread using a code known by the base station and all mobile stations. Spreading the pilot and traffic signals spreads the spectrum of transmissions in the system.

One example of a spread spectrum communication system is a cellular radiotelephone system according to Telecommunications Industry Association/Electronic Industry Association (TIA/EIA) Interim Standard IS-95, "Mobile Station-Base Station Compatibility Standard for Dual-Mode Wideband Spread Spectrum Cellular System" ("IS-95"). Individual users in the system use the same frequency but are distinguishable from each other through the use of individual spreading codes. Other spread spectrum systems include radiotelephone systems operating at 1900 MHz, commonly referred to as DCS1900. Other radio and radiotelephone systems use spread spectrum techniques as well.

IS-95 is an example of a direct sequence code division multiple access (DS-CDMA) communication system. In a DS-CDMA system, transmissions are spread by a pseudo-random noise (PN) code. One data symbol consists of several chips, where the chip is the spread spectrum minimal-duration keying element. A key system parameter is the chip duration or chip time ($T_c$). In an IS-95 system, the chip clock rate is 1.2288 Mega-chips per second, equivalent to a $T_c$ of about 0.814 $\mu$sec/chip.

Receivers for use in spread spectrum communication systems commonly employ RAKE receivers. A RAKE receiver includes two or more finger receivers that independently receive radio frequency (RF) signals. Each finger estimates channel gain and phase and demodulates the RF signals to produce traffic symbols. The traffic symbols of the finger receivers are combined in a symbol combiner to produce a received signal.

Timing jitter and timing error of Delay-Lock Loop (DLL) is critical in demodulating received signals in CDMA systems, especially Quadrature Amplitude Modulated (QAM) signals. Receiver DLL timing error may increase the Inter Symbol Interference (ISI) caused by the receive base band matched filter. When higher order modulation schemes are used to increase the data transmission rate, the degradation due to the time recovery error can be more significant.

Current widely used time recovery circuits are based on an early-late DLL structure that applies a control loop (which can be first or second order) to reduce the difference between cross correlations of the early and late signals and the PN sequence. Because of the symmetrical property of the early and late cross correlations represented in the S-curve, the receiver and the transmitter is synchronized when the difference between the early and late correlations is zero. Such a DLL structure can be modeled as a closed loop control system as shown in FIG. 1, under the ideal condition that the DLL can make arbitrary small time adjustments. In FIG. 1, t is the time change that the DLL needs to track and u is the noise that the control loop needs to suppress. The time change is tracked as quickly as possible when the closed loop system has a wide bandwidth. However, noise is best suppressed when the closed loop system has a narrow bandwidth. These contradictory performance requirements make it difficult to design a control system. For the DLL in current CDMA systems, the worst time tracking error has been shown to be at least a sixteenth of the chip rate ($T_c/16$). In CDMA specifications, a time tracking error of an eighth of the chip rate ($T_c/8$) is commonly assumed. Another drawback of the conventional DLL design is that the gain scale factor $k_d$ and the noise u depend on the received signal to noise ratio (SNR) (related to the transmitted signal power), fading channel gain and the Additive White Gaussian Noise (AWGN) in the channel. This means that the optimally designed closed loop system has to be gain adaptive to the estimated SNR.

Thus, there is a need for an improved time recovery circuit and method for synchronizing timing of a signal in a receiver to timing of a signal in a transmitter by reducing the timing jitter and timing error of a DLL.

DETAILED DESCRIPTION OF THE DRAWINGS

The present invention provides a novel time recovery circuit and method for time aligning a transmitter and receiver by reducing the timing jitter and timing error of a DLL. In the preferred embodiment, five (5) samples of an input signal are taken around the equilibrium point (time error=0). A recursive algorithm is used to compute the expected time adjustment necessary to time align a transmitter and a receiver by minimizing the squared estimation error. Whereas the conventional early-late DLL structure takes only one point on the S-curve, the preferred embodiment of the apparatus and method of the present invention takes five (5) points and averages out the effect of noise in all the samples. In alternate embodiments, more or less points may be taken.

Figure 1:
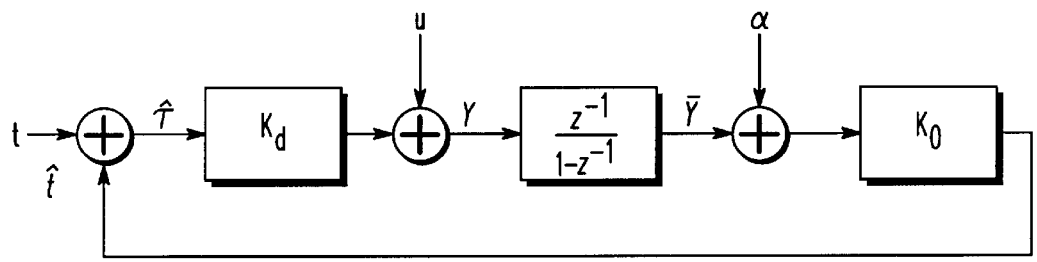
FIG. 1 is a block diagram of a known DLL structure modeled as a closed loop control system.
Figure 2:
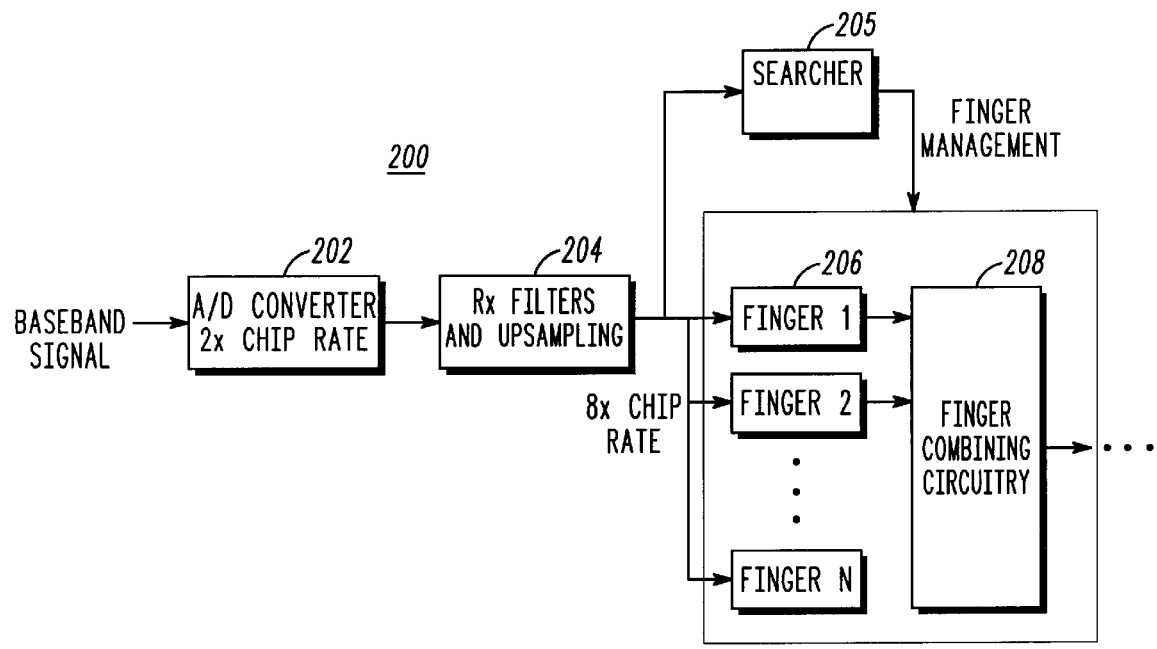
FIG. 2 is a block diagram of a base band receiver that can implement the time recovery circuit and method of the present invention.
Figure 3A:
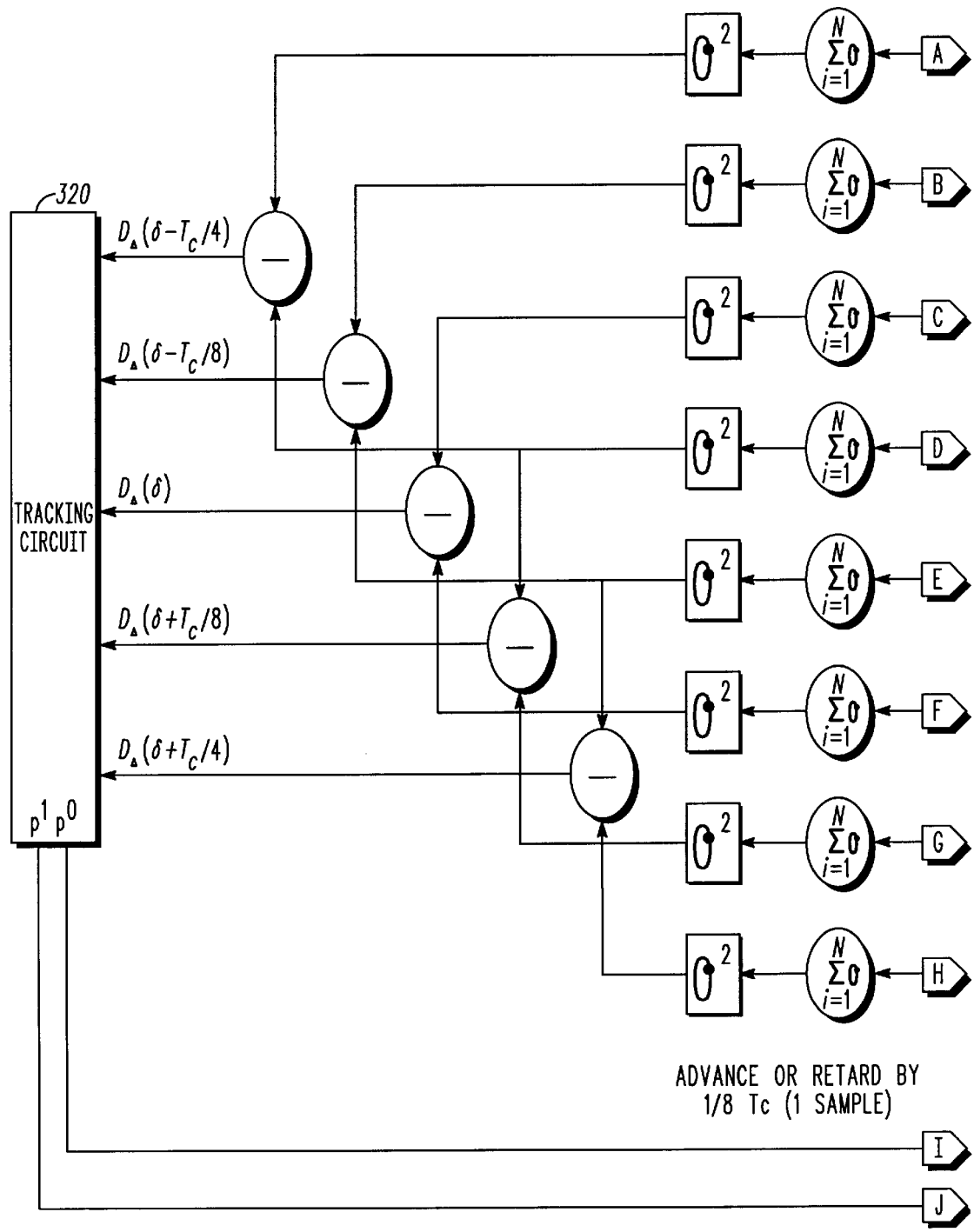
FIGS. 3A and 3B depict a functional block diagram of the preferred embodiment of the time recovery circuit of the present invention.
Figure 3B:
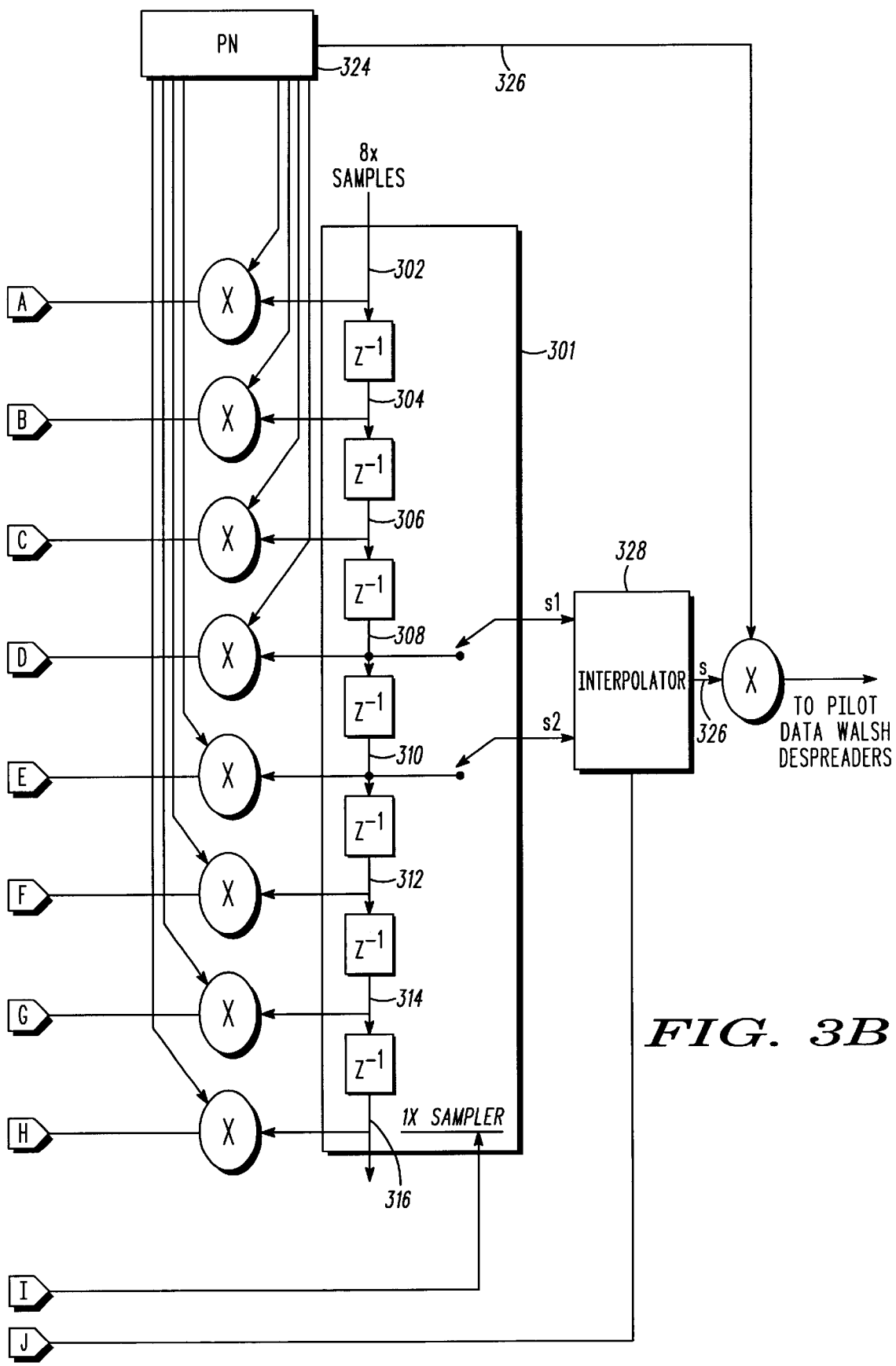

A block diagram of a simplified base band receiver 200 of a device that can implement the embodiments of the present invention is shown in FIG. 2. The receiver 200 receives a base band signal in an A/D converter 202 that converts the signal from an analog signal to a digital signal at twice (2×) the chip rate. The digital signal is filtered and up sampled to eight times (8×) the chip rate in the Rx filter and up sampling block 204. The signal is fed into a plurality of finger receivers 206. Each finger receiver 206 implements the time recovery circuit and method of the present invention to synchronize the receiver demodulator (not shown) with the timing of the transmitter (not shown). In the preferred embodiment, the circuit and method is implemented in an Application Specific Integrated Circuit (ASIC) using components that perform the functions as shown in FIGS. 3A and 3B. Such components are readily recognized by one of ordinary skill in the art. The tracking circuit (320 in FIG. 3A) can be implemented in an ASIC or in software. Referring back to FIG. 2, the output signal of each finger receiver 206 is combined into a composite signal by the finger combining circuitry 208. The composite signal is processed further (dewalshed, decoded, etc.) and delivered to the intended application within the receiver.

The signal from the Rx filter and up sampling block 204 is also fed into a searcher 205. The searcher 205 is a signal correlator that runs independently in parallel with the finger receivers 206. The searcher 205 looks for signal energy peaks on the pilot or traffic channel signals at a specific time instance so that the receiver timing is roughly synchronized with the transmitter within a fraction of a $T_c$, such as ½ $T_c$. Once the receiver timing has been synchronized to within a fraction of a chip time using the searcher 205, the timing difference between the receiver 200 and transmitter is further refined to approach zero using a DLL implementing the time recovery circuit of the present invention. The elements that comprise the receiver 200 are known in the art and are not discussed further herein.

Referring to FIGS. 3A and 3B, the preferred embodiment of the time recovery circuit is shown. In the preferred embodiment, the discriminator D=3/16 $T_c$. D is defined as one half the difference between the early signal and the late signal. The time recovery circuit can be designed for other choices of D, such as ¼ $T_c$, ½ $T_c$, etc, as well. After the first stage of searching is completed in block 205 of FIG. 2, the time recovery circuit performs correlation on the signal from the Rx filter and up sampling block 204. The sampling rate for the input signal is 8×of 1/Tc. To recover the time difference between the transmitter and the receiver 200, the preferred embodiment of the apparatus and method of the present invention calculates five early-late squared correlation differences. Each early-late squared correlation pair involves an early squared correlation of a sample of the signal and a late squared correlation of a sample of the signal that has been delayed in time by 3/8 $T_c$. In particular, the first early-late squared correlation pair involves a first sample 302 and a fourth sample 308. The second early-late squared correlation difference involves a second sample 304 and a fifth sample 310. The third early-late squared correlation difference involves a third sample 306 and a sixth sample 312. The fourth early-late squared correlation difference involves the fourth sample 308 and a seventh sample 314. The fifth early-late squared correlation difference involves the fifth sample 310 and an eighth sample 316. In alternate embodiments, the invention may calculate more or less early-late squared correlation differences and remain within the scope of the invention. An on-time signal 326 is also produced at the output of the interpolator 325.

In the time recovery circuit 300 of FIGS. 3A and 3B, samples of the input signal are multiplied by the PN code from the PN despreader 324 to produce a plurality of results (N). The N results are summed to produce early and late correlations. The early correlations are 2D ahead of the late correlations. The early and late correlations are squared to produce early squared correlations and late squared correlations, respectively. (The step of squaring can be omitted for an implementation using a coherent DLL.) The difference of each of the five early and late squared correlation pairs is calculated to produce the inputs into the tracking circuit 320. The tracking circuit 320 outputs two variables $p_0$ and $p_1$. Variable $p_0$ is used by the 1×sampler 301 to advance or retard the samples of the signal by ⅛ $T_c$ to time align the receiver 200 with the transmitter. When $p_0$ is equal to 1, the samples are advanced by ⅛$T_c$; when $p_o$ is equal to −1, the samples are retarded by ⅛ $T_c$. When the timing difference between the transmitter and the receiver 200 is less than ⅛ $T_c$. ($p_0$ is equal to zero). the on-time time signal can not be achieved by advancing or retarding the samples of the signal by ⅛ $T_c$. In such a case, an Interpolator 328 is used to interpolate two signals s1 and s2 around the on-time signal. In the preferred embodiment, the 1× sampler 301 is a memory device that stores eight samples of the signal. Signals $s_1$ and $s_2$ are switches that connect the appropriate samples as inputs to the interpolator 328.

Preferably, signals $s_1$ and $s_2$ are ⅛ $T_c$ apart. The interpolation is linear, i.e., the on-time signal is a weighted summation of the signals $s_1$ and $s_2$. For example, the closer the on-time signal is to $s_1$, the larger the weight is placed on $s_1$. The interpolation is governed by the following relationship:

$s=s_1(0.5-p_1)+s_2(0.5+p_1)$, $-0.5 £ p_1 £ 0.5$ ($p_1$ is always in the specified range).

For example, when $p_1=0$, the on-time signal is at the middle of $s_1$ and $s_2$, thus $$s = \frac{s_1}{2} + \frac{s_2}{2}.$$

When $-0.5 £ p_1 £ 0$, the on-time signal is closer to $s_1$; when $0 £ p_1 £ 0.5$, the on-time signal is closer to $s_2$.

Figure 4:
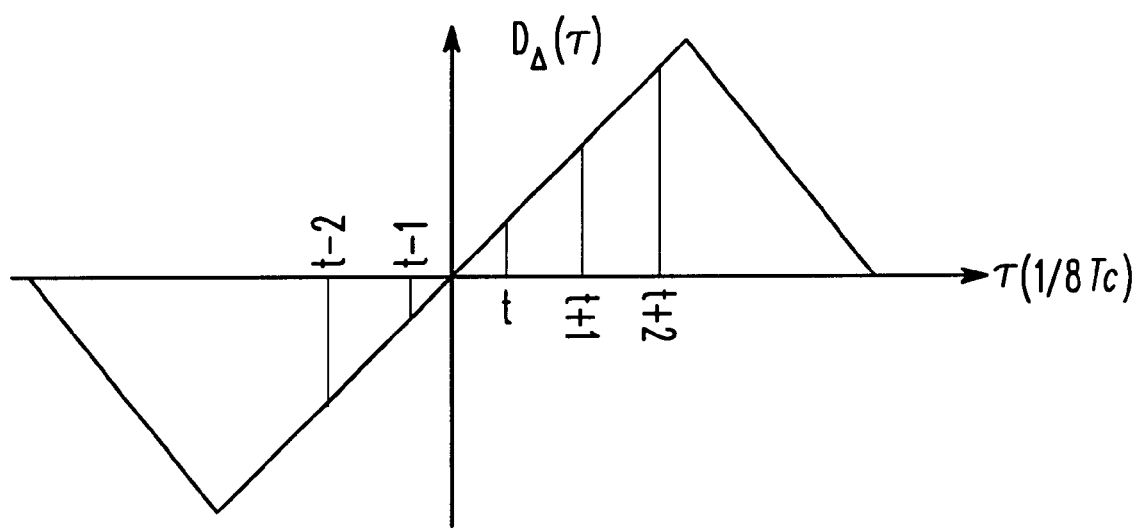
FIG. 4 is a graph of the S-curve for a Delay-Lock Loop Discriminator.

Because the early-late squared correlation difference $D_A(\delta)$, or the S-curve of the DLL discriminator, is linear and, symmetric in the normal operating range around the origin as shown in FIG. 4, the invention minimizes the estimation error to compute the time adjustment for the DLL. The estimation error is given by:

$$\min_{k,b} E(y_i + b - k \cdot x_i)^2 \qquad (1)$$

where, $y_i = D_A(\delta - Tc/4), D_A(\delta - Tc/8), D_A(\delta), D_A(\delta + Tc/8), D_A(\delta + Tc/4)$, (2)

$x_i = -2, -1, 0, 1, 2$ for $i=1, \ldots, 5$ respectively; (3)

$k$ is the slope, and (4)

$t=b/k$=the time offset of the receiver. (5)

In the preferred embodiment of the present invention, $x_i$ in (3) and t in (5) above are in units of $$\frac{T_c}{8}.$$

In alternate embodiments, $x_i$ and t may be in units of a different fraction (or multiple) of $T_c$. To compute the expectation, the expectation in (1) is replaced by temporal averaging and the problem becomes:

$$\min_{k,b} \sum_{m=1}^{M} \sum_{i=1}^{5} (y_i(m) + b - k \cdot x_i(m))^2 \qquad (6)$$

where M is the number of accumulations needed by the algorithm. The larger the M, the more robust the result. However, a large M translates into a large delay of the DLL to track the time shift. The total tracking delay of the time recovery circuit of the present invention is M×N, where N is the time length of the accumulation. In equation (6), the solution of k and b is:

$$k = \frac{\sum_{m=1}^{M}\sum_{i=1}^{5} x_i(m)y_i(m)}{\sum_{m=1}^{M}\sum_{i=1}^{5} x_i^2(m)} \text{ and } b = \frac{-1}{5M}\sum_{m=1}^{M}\sum_{i=1}^{5} y_i(m) \qquad (7)$$

As shown in FIG. 3A the time recovery circuit 300 includes a tracking circuit 320 that solves for the time offset t=b/k using (7) above and ultimately provides signals $p_0$ and $p_1$. In a first embodiment, the tracking circuit 320 solves for $p_0$ and $p_1$ using a sliding window method that is shown in the flow diagram of FIG. 5. At steps 502 and 504, the method waits for M accumulations of each of the five early-late squared correlation differences and then sums the accumulations. At step 506, the method multiples each of the summed accumulations by a weight. In particular, the method multiplies the result of 504A by −2, the result of 504B by −1, the result of 504C by 0, the result of 504D by 1, and the result of 504E by 2. At step 508, the method sums the weighted accumulations. At step 510, the method multiplies the summed weighted accumulations by −½ to produce k. At step 509, the method sums the accumulations of each of the five early-late squared correlation differences to produce b. At step 512, the method calculates the time offset of the receiver t=b/k. At step 514, the method determines whether t is greater than or equal to 1. If the answer is yes, the method determines that $p_0$=1 and $p_1$=0 (step 516). If the answer is no, the method determines whether t is less than 1 but greater than or equal to 0.5 (step 518). If the answer is yes, the method determines that $p_0$=1 and $p_1$=t−1 (step 520). If the answer Is no, the method determines whether t is less than 0.5 but greater than −0.5 (step 522). If the answer is yes, the method determines that $p_0$=0 and $p_1$=t (step 524). If the answer is no, the method determines whether t is less than or equal to −0.5 but greater than −1 (step 526). If the answer is yes, the method determines that $p_0$=−1 and $p_1$=t+1 (step 528). If the answer is no, the method determines that $P_0$=−1 and $p_1$=0 (step 530).

In a second embodiment of the tracking circuit 320 of FIG. 3A, a recursive method without M accumulation is used. The recursive method avoids the M number of accumulations by using a recursive accumulation with a forgetting factor α, where 0>α>1. In the recursive method, the function in equation (6) is replaced by:

$$\min_{k,b} \sum_{m=0}^{\infty} \alpha^m \sum_{i=1}^{5} (y_i(m) + b - k \cdot x_i(m))^2 \qquad (8)$$

where, $$k = \frac{\sum_{m=0}^{\infty} \alpha^m \sum_{i=1}^{5} x_i(m)y_i(m)}{\sum_{m=0}^{\infty} \alpha^m \sum_{i=1}^{5} x_i^2(m)} \text{ and } b = \frac{\alpha-1}{5}\sum_{m=0}^{\infty}\sum_{i=1}^{5} y_i(m) \qquad (9)$$

Figure 6:
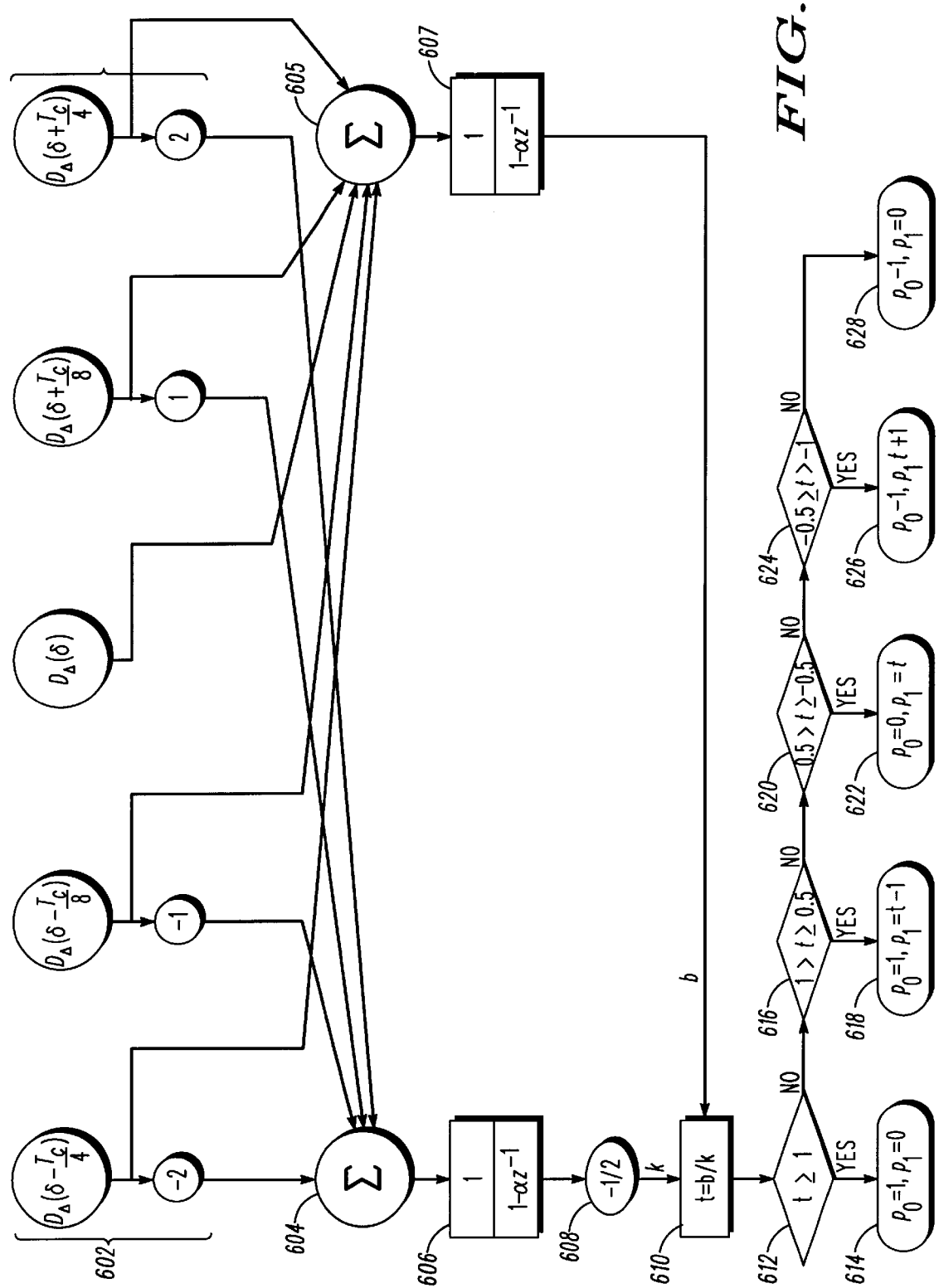
FIG. 6 is a flow diagram of a second embodiment of the tracking circuit used in the time recovery circuit of FIGS. 3A and 3B.

The recursive method is shown in the flow diagram of FIG. 6. At step 602, the method multiplies each of the early-late squared correlation differences by a weight. In particular, the method multiplies $$D_\Delta\left(\delta - \frac{T_c}{4}\right) \text{ by } -2,$$

$$D_\Delta\left(\delta - \frac{T_c}{8}\right) \text{ by } -1, D_\Delta(\delta) \text{ by } 0,$$

$$D_\Delta\left(\delta + \frac{T_c}{8}\right) \text{ by } 1 \text{ and } D_\Delta\left(\delta + \frac{T_c}{4}\right) \text{ by } 2.$$

At step 604, the method sums the weighted early-late squared correlation differences. At step 606, the method filters the result of 604 using a first order filter with coefficient α. As known in the art, the relationship of the input and output of the filter is represented by:

$$O(n) = \alpha \cdot O(n-1) + (n)$$

where n=1,2,3 . . . (time steps)

O is the output of the filter; and

I is the input of the filter.

At step 608, the method multiplies the result of step 606 by a weight (−½) to produce k. At step 605, the method sums the five early-late squared correlation differences. At step 607, the method filters the result of 605 using a first order filter as described above to produce b. At step 610, the method calculates the offset of the receiver $$t = \frac{b}{k}.$$

At step 612, the method determines whether t is greater than or equal to 1. If the answer is yes, the method determines that $p_0$=1 and $p_1$=0 (step 614). If the answer is no, the method determines whether t is less than 1 but greater than or equal to 0.5 (step 616). If the answer is yes, the method determines that $p_0$=1 and $p_1$=t−1 (step 618). If the answer is no, the method determines whether t is less than 0.5 but greater than −0.5 (step 620). If the answer is yes, the method determines that $P_0$=0 and $p_1$=t (step 622). If the answer is no, the method determines whether t is less than or equal to −0.5 but greater than −1 (step 624). If the answer is yes, the method determines that $P_0$=−1 and $p_1$=t+1 (step 626). If the answer is no, the method determines that $p_0$=−1 and $p_1$=0 (step 628).

Figure 5:
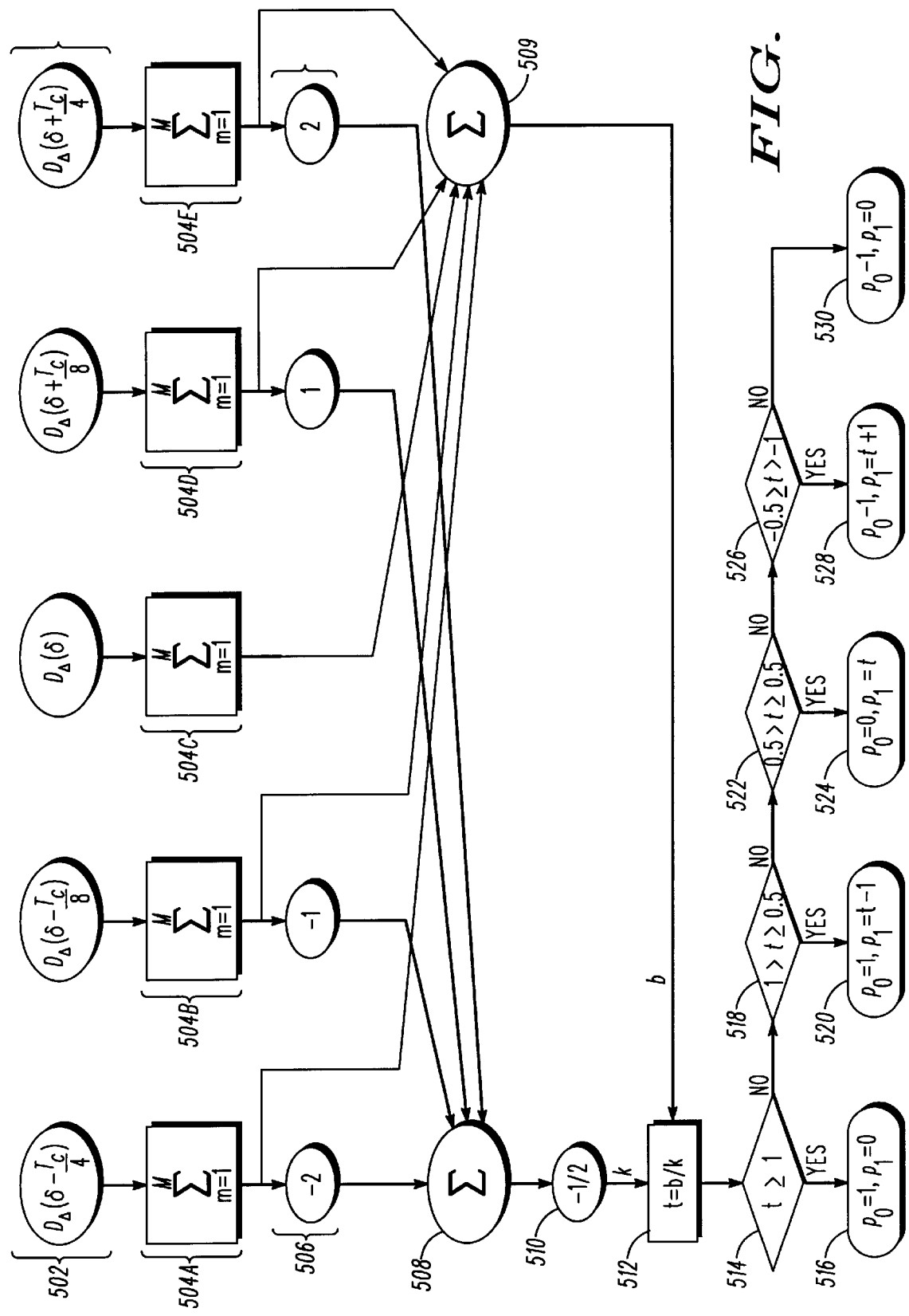
FIG. 5 is a flow diagram of a first embodiment of the tracking circuit used in the time recovery circuit of FIGS 3A and 3D.

As shown in the algorithms of FIGS. 5 and 6, when the timing difference between the transmitter and the receiver 200 is less than 1/16 $T_c$, signal $p_1$ from the time tracking circuit 320 is used to interpolate the sampled signal. The output "s" from the interpolator 328 is then multiplied by the PN spreading sequence. The result is a signal that is time aligned with the transmitter.

In the preferred embodiment of the time recovery circuit 300 of the present invention, the values of parameters M, N and α should be chosen by the system designer depending on the particular application. Larger values of M, N or α yield smaller DLL time jitter, i.e., the time tracking circuit 320 in FIG. 3 is more accurate. However, large values of M, N or α also yield large time tracking delays, i.e., the DLL needs more time to respond. For example, when N=512 and M=100, the timing tracking delay of DLL is M×N=51200 $T_c$.

The DLL in the time recovery circuit of the present invention can track a signal slewing one Tc/8 per 51200 Tc, with a standard deviation of tracking error of 0.4 (Tc/8) when the frequency offset between the transmitter and the receiver 200 is 1200 Hz. If the slew rate of the signal is reduced to Tc/8 per 102400 Tc, we can choose N=512 and M=200. In such a case, the standard deviation of the tracking error can be reduced to 0.25 (Tc/8) when the frequency offset between transmitter and the receiver 200 is 1200 Hz.

While the invention may be susceptible to various modifications and alternative forms, a specific embodiment has been shown by way of example in the drawings and has been described in detail herein. However, it should be understood that the invention is not intended to be limited to the particular forms disclosed. Rather, the invention is to cover all modification, equivalents and alternatives falling within the spirit and scope of the invention as defined by the following appended claims.

What is claimed is:

1. A method of synchronizing timing of a signal in a receiver to timing of the signal in a transmitter comprising the steps of:
   synchronizing timing of the signal in the receiver to timing of the signal in the transmitter to within a fraction of a chip time;
   producing a plurality of early squared correlations with the signal:
   producing a plurality of late squared correlations with the signal;
   creating a plurality of early-late squared correlation pairs from the plurality of early squared correlations and the plurality of late squared correlations;
   for each early-late squared correlation pair, calculating a difference between the early squared correlation and the late squared correlation to produce a plurality of power differences; and
   using the plurality of power differences to further synchronize timing of the signal in the receiver to timing of the signal in the transmitter.

2. The method of claim 1 wherein before the step of producing a plurality of early squared correlations from the signal, the method filters and upsamples the signal to eight times a chip rate.

3. The method of claim 1 wherein the step of producing a plurality of early squared correlations with the signal comprises the steps of:
   for each of the plurality of early squared correlations,
      multiplying the signal by a pseudonoise code a predetermined number of times to produce a plurality of results;
      summing the plurality of results to produce an early correlation; and
      squaring the early correlation to produce an early squared correlation.

4. The method of claim 1 wherein the step of producing a plurality of late PN correlations from the signal comprises the steps of:
   for each of the plurality of late squared correlations,
      multiplying the signal by a pseudonoise code a predetermined number of times to produce a plurality of results;
      summing the plurality of results to produce a late correlation; and
      squaring the late correlation to produce a late squared correlation.

5. The method of claim 1 wherein the step of creating a plurality of early-late squared correlation pairs from the plurality of early squared correlations and the plurality of late squared correlations comprises the step of creating each pair using a late squared correlation that is behind an early squared correlation by three time units of one eighth chip duration or chip time.

6. The method of claim 1 wherein the step of using the plurality of power differences to further synchronize timing of the signal in the receiver to timing of the signal in the transmitter comprises:
   for each of the plurality of power differences,
      accumulating a predetermined number of the power differences;
      summing the accumulation;
      multiplying the summed accumulation by a first weight;
   summing the plurality of weighted summed accumulations of the plurality of power differences;
   multiplying the summed plurality of weighted summed accumulations by a second weight to yield k:
   summing the plurality of summed accumulations to yield b;
   calculating time offset, $$t = \frac{b}{k};$$

determining a first variable $p_0$ and a second variable $p_1$ from the time offset;
   when timing of the signal in the receiver differs from timing of the signal in the transmitter by more than a predetermined traction of the chip time, using $p_0$ to advance or retard samples of the signal in the receiver by the predetermined fraction of the chip time to further synchronize timing of the signal in the receiver to timing of the signal in the transmitter; and
   when timing of the signal in the receiver differs from timing of the signal in the transmitter by less than a predetermined fraction of the chip time,
   interpolating using $p_1$ to further synchronize timing of the signal in the receiver to timing of the signal in the transmitter.

7. The method of claim 6 wherein the step of determining $p_0$ and $p_1$ from t comprises determining that $p_0$ is equal to 1 and $p_1$ is equal to 0 when t is greater than or equal to 1.

8. The method of claim 6 wherein the step of determining $p_0$ and $p_1$ from t comprises determining that $p_0$ is equal to 1 and $p_1$ is equal to t−1 when t is less than 1 but greater than or equal to 0.5.

9. The method of claim 6 wherein the step of determining $p_0$ and $p_1$ from t comprises determining that $p_0$ is equal to 0 and $p_1$ is equal to t when t is less than 0.5 but greater than −.5.

10. The method of claim 6 wherein the step of determining $p_0$ and $p_1$ from t comprises determining that $p_0$ is equal to −1 and $p_1$ is equal to t+1 when t is less than or equal to −0.5 but greater than −1.

11. The method of claim 6 wherein the step of determining $p_0$ and $p_1$ from t comprises determining that $p_0$ is equal to −1 and $p_1$ is equal to 0 when t is less than −1.

12. The method of claim 1 wherein the step of using the plurality of power differences to further synchronize timing of the signal in the receiver to timing of the signal in the transmitter comprises:

multiplying each of the plurality of power differences by a first weight to produce a plurality of weighted power differences;

summing the plurality of weighted power differences;

filtering the summed plurality of weighted power differences using a first order filter with coefficient a;

multiplying the filtered sum of the plurality of weighted power differences by a second weight to yield k;

summing the plurality of power differences;

filtering the summed plurality of power differences using the first order filter with coefficient a to yield b;

calculating $$t = \frac{b}{k};$$

determining $p_0$ and $p_1$ from t;

when timing of the signal in the receiver differs from timing of the signal in the transmitter by more than a predetermined fraction of the chip time, using $p_0$ to advance or retard samples of the signal in the receiver by the predetermined fraction of the chip time to further synchronize timing of the signal in the receiver to timing of the signal in the transmitter; and when timing of the signal in the receiver differs from timing of the signal in the transmitter by less than a predetermined fraction of the chip time, interpolating using $p_1$ to further synchronize timing of the signal in the receiver to timing of the signal in the transmitter.

13. The method of claim 12 wherein the step of determining $p_0$ and $p_1$ from t comprises determining that $p_0$ is equal to 1 and $p_1$ is equal to 0 when t is greater than or equal to 1.

14. The method of claim 12 wherein the step of determining $p_0$ and $p_1$ from comprises determining that $p_0$ is equal to 1 and $p_1$ is equal to t−1 when t is less than 1 but greater than or equal to 0.5.

15. The method of claim 12 wherein the step of determining $p_0$ and $p_1$ from t comprises determining that $p_0$ is equal to 0 and $p_1$ is equal to t when t is less than 0.5 but greater than 0.5.

16. The method of claim 12 wherein the step of determining $p_0$ and $p_1$ from t comprises determining that $p_0$ is equal to −1 and $p_1$ is equal to t+1 when t is less than or equal to −0.5 but greater than −1.

17. The method of claim 12 wherein the step of determining $p_0$ and $p_1$ from t comprises determining that $p_0$ is equal to −1 and $p_1$ is equal to 0 when t is less than −1.

18. An apparatus for synchronizing timing of a signal in a receiver to timing of the signal in a transmitter comprising:

a searcher for synchronizing timing of the signal in the receiver to timing of the signal in the transmitter to within a fraction of a chip time; and a time recovery circuit that produces a plurality of early squared correlations with the signal; produces a plurality of late squared correlations with the signal; creates a plurality of early-late squared correlation pairs from the plurality of early squared correlations and the plurality of late squared correlations; for each early-late squared correlation pair, calculates a difference between the early squared correlation and the late squared correlation to produce a plurality of power differences; and uses the plurality of power differences to further synchronize timing of the signal in the receiver to timing of the signal in the transmitter.

* * * * *

UNITED STATES PATENT AND TRADEMARK OFFICE
CERTIFICATE OF CORRECTION

PATENT NO. : 6,775,341 B2
DATED : August 10, 2004
INVENTOR(S) : Wang et al.

It is certified that error appears in the above-identified patent and that said Letters Patent is hereby corrected as shown below:

Column 2,
Line 55, "and 3D" should be -- and 3B --

Signed and Sealed this

Twenty-eighth Day of September, 2004

JON W. DUDAS
*Director of the United States Patent and Trademark Office*